(12) United States Patent
Carrasco Vergara

(10) Patent No.: US 7,749,117 B2
(45) Date of Patent: Jul. 6, 2010

(54) OVOID CHAINRINGS FOR OPTIMISING CONVENTIONAL PEDALING

(75) Inventor: Pablo Carrasco Vergara, Málaga (ES)

(73) Assignee: Rotor Components Technologies, S.L., Madrid (ES)

( * ) Notice: Subject to any disclaimer, the term of this patent is extended or adjusted under 35 U.S.C. 154(b) by 744 days.

(21) Appl. No.: 11/351,993

(22) Filed: Feb. 10, 2006

(65) Prior Publication Data

US 2006/0211529 A1 Sep. 21, 2006

(30) Foreign Application Priority Data

Mar. 15, 2005 (ES) ................. 200500594

(51) Int. Cl.
*F16H 55/30* (2006.01)
(52) U.S. Cl. ............... 474/152; 474/141; 280/259
(58) Field of Classification Search ............ 474/152, 474/141, 151; 280/259
See application file for complete search history.

(56) References Cited

U.S. PATENT DOCUMENTS

| | | | | | |
|---|---|---|---|---|---|
| 513,589 | A | * | 1/1894 | Metz | ........................... 474/141 |
| 515,499 | A | * | 2/1894 | Scovell | ........................ 431/115 |
| 596,289 | A | * | 12/1897 | Smith | .......................... 474/141 |
| 4,865,577 | A | * | 9/1989 | Freudenstein | ................ 474/141 |
| 5,549,314 | A | * | 8/1996 | Sassi et al. | .................. 280/259 |
| 5,660,386 | A | * | 8/1997 | Krieger | .......................... 124/7 |
| 2004/0074705 | A1 | * | 4/2004 | Peyre | ...................... 188/24.12 |

FOREIGN PATENT DOCUMENTS

| | | | |
|---|---|---|---|
| BE | 885299 | * | 1/1977 |
| DE | 2752964 | * | 5/1979 |
| DE | 8809795 | * | 1/1988 |
| DE | 202004006544 | * | 5/2004 |
| FR | 1090949 | * | 4/1955 |
| WO | WO2004062997 | * | 7/2004 |

* cited by examiner

Primary Examiner—Bradley T King
Assistant Examiner—James K Hsiao
(74) Attorney, Agent, or Firm—Margeurite Del Valle

(57) ABSTRACT

Improvement in the design of variable original radius chainrings for coupling to conventional bicycle cranks in order to apply traction, which primarily consists of its being provided with a plurality of possible anchorages to the crank, so that the user may adjust the relative position between the crank and the major radius of the chainring, and thus optimize the biomechanics of his own pedalling; furthermore, other design parameters are offered to endow this non-circular pedalling with leg speeds optimized within the limitation of pedalling with cranks at 180 degrees and therefore with a dead spot.

4 Claims, 9 Drawing Sheets

# OVOID CHAINRINGS FOR OPTIMISING CONVENTIONAL PEDALING

The present invention, applicable to bicycles and pedal powered vehicles comprises improvements concerning chainrings for pedal drive systems by means of a chain or belt in which the traditional circular form is modified on the basis of reducing the effect of the dead centers in the pedaling cycle, for the purpose of successfully optimizing pedaling.

PRIOR ART

Since the end of the 19th century there have been a great number of attempts to increase the efficiency of pedaling and to reduce the effects of the dead centers. To specify, it is during the pedal down-stroke when practically all power is produced in the pedaling cycle. The maximum power output is reached when the crank arm is at about 90° from top dead center, when the tangential component of the force applied is greatest; and when one of the pedals is up and the other is down a power vacuum occurs, to commonly referred as the dead spot, which is due to the practical cancellation of the tangential component of the forces on the pedals.

Many of these attempts have come by way of the use of non-circular or "ovoid" chainrings, whether oval, elliptical or other more complex composites of various sections of curves and straights, for which two main primitive diameters, the major and the minor, could be defined in any case. Various other attempts have arisen, however, by means of the use of independent cranks in order to optimize the dynamics of each leg separately, and to date these have proved to be the most effective way of optimizing pedaling in biomechanical terms.

Amongst the former we could single out two possibilities through being the closest on the market and the competition, the Shimano Biopace chainrings (U.S. Pat. No. 4,522,610) and the Osymetric chainrings (U.S. Pat. No. 5,549,314), although we may cite other older documents: U.S. Pat. Nos. 513,589, 515,449, GB191318888, FR645447, GB327681, FR1090949, DK64514C and GB449504, amongst others, and to quote a more recent one, U.S. Pat. No. 5,882,025. In these it may be clearly appreciated that "ovoid" chainrings eventually succeeded in becoming widely known. As prior art, one must pay special attention to patent FR1090949, due to its likeness to the current proposal, regarding the orientation of the ovoid, which can be varied.

The aim of these different chainrings has always been, in one way or another, to take advantage of the areas where most force is applied during the cycle, by means of a variable drive radius, so as to give greater thrust to the bicycle, resorting for this purpose to the application of three primary design factors:
the orientation factor: the angle between the centerline of the cranks and the major primitive diameter of the ovoid, which is related to the position of the descending crank with respect to top dead center ("TDC") at the moment of the maximum gear ratio (when the maximum radius transfers traction);
the elongation factor: the proportion ratio between the major and minor primitive diameters of the ovoid, and
the form factor: which depends on the curves shaping the perimeter of this ovoid (ellipses, circumference arcs, straight sections, etc)

Of all these previously mentioned ovoid chainrings not one has been successful in the market. Despite the fact that many had an aspect which was well conceived, none have combined enough well conceived factors to date, to attain success.

The main reason for lack of success was due to the orientation factor being ineffective. As not everybody pedals in the same manner, it cannot be said that these were bad products, in fact a number still have a few enthusiasts. However, the orientation factor is vital for the biomechanics of pedaling, and even though these orientations were accepted by a small percentage of cyclists, they are ineffective for the large majority.

Thus, for example, even though Biopace chainrings probably worked for some, they ended up disappearing from the market. In my modest opinion, even though they were acceptable with regard to elongation and form, their orientation factor was excessively obtuse, i.e. if maximum force is applied with the crank at 90° from top dead center (TDC), maximum gear ratio was attained too late during the down stroke, almost coinciding with the pedal at the bottom dead center (BDC).

As for the Osymetrics, their orientation factor is rather acute, like most of the ovoid chainrings seen hitherto, ~90°, which causes the moment of maximum gear ratio to coincide with the crank at the region where the most force is available, in such they do not take advantage of the action of inertia, which calls for a certain delay. In addition, owing to their form and elongation factors, the variations in speed are very high around the dead centers, which is detrimental to knee health and the reason why many people gave up using chainrings of this type. Accordingly, they may work relatively well for cyclists with a lot of strength, particularly on flat terrain, but could easily overload the cyclists knees, making this system unacceptable for the majority of cyclists, in normal use.

As for adjustable chainrings like in patent FR1090949, their recommended orientation was never accurate enough, and/or the combination of elongation and shape factor were so erratic, that it was impossible to find an advantageous combination of factors.

As regards the other attempts at optimizing pedaling, in those making use of independent cranks, each crank drives the chainring, which is offset, by means of a link and thus the effective gear ratio passes from a maximum to a minimum in each cycle at opposing sides of the cycle, according to how the effective lever distance varies. The speed of each crank thereby varies, so that, when one goes slower (during the extension of the leg, thereby taking better advantage of the more powerful area of the pedaling cycle), the other crank moves faster and has gone ahead of TDC when the first one reaches BDC.

Of these we may single out above all a first patent DE76215 of 1893, which lays down the basic configuration and today the RS4 Rotor (US 2005/0022626 A1) of the same inventor whose is the present document, being a product that is now on the market (under the product names RS4 and RS4X), which are used in competition with brilliant results.

For these we may also define two parameters or design factors:
the orientation factor: this is the angle in respect of TDC formed by the descending crank arm at the moment when the gear ratio is maximum, and may be considered equivalent to that of ovoid chainrings,
the eccentricity factor: which represents the relationship between the maximum and minimum drive ratio, and is thus related to the aforementioned elongation factor, which corresponds to that of ovoid chainrings.

The experience with this cited Rotor RS4, which even though it may not be considered of widespread use already represents that of thousands of cyclists worldwide, clearly reveals the importance that the orientation factor has in the biomechanics of pedaling: the optimum position of maximum gear ratio—the optimum orientation factor—is delayed in relation to where the maximum power can be delivered.

Therefore, even though the optimum orientation is not a fixed value, being dependent both on geometric and dynamic factors, we can see why previous attempts in ovoid chainring orientation were unsuccessful.

The cited geometric factors define the position where every cyclist executes maximum torque delivery. These are the geometry of the bicycle, the position of the saddle on it, the length of the crank arms, as well as the fact of pedaling either seated or standing up. Also, the dimensions of the user's body play an important role.

The cited dynamic factors mainly comprise variations in inertia while pedaling, which will influence the skew that should exist between the position of the crank arm where the leg executes maximum torque delivery and the position where gear ratio reaches its maximum. Naturally this is not a case of a fixed value, as it depends on the different pedaling conditions, such as level terrain or climbing, pedaling seated or standing up, or the preference for pedaling at a faster or slower cadence.

All this affects the optimum orientation factor. Widespread use will, therefore, require a general guideline, a compromise solution, which can be varied upon for each individual user.

For the cited Rotor, the general recommended orientation factor is 115° from TDC, but the final individual user settings normally range between 103° and 127°. The TDC and BDC locations are a function of the location of the cyclist's hips in relation to the bicycles bottom bracket.

This confirms that it would prove difficult for any of the previous ovoid chainring designs to work well, initially due to incorrectly chosen orientation factors. Also, although a given factor is good for some cyclists, bicycles or types of use, it will not be good for others. Therefore, if we were to then make a chainring using the perfect compromise orientation factor we will define, it would be effective for the majority of cyclists, but this single setting would still not be effective for a minority. For this reason, adjustment possibilities around the optimum average position, will improve this average optimum for individual use.

SUMMARY OF THE INVENTION

In order to optimize pedaling, it is not our intention to improve the biomechanics of the above-mentioned Rotor, but to claim an ovoid chainring, designed to be used with traditional cranks, which imitates the operation of the Rotor, primarily in the quarter turn of the crank arm corresponding to the highest generation of power during the cycle, namely in the down-stroke of the pedal, between approximately 45°-135° from TDC. Additionally, while in the dead point region, these chainrings will imitate a smaller round chainring: a smaller radius will be adopted in order to abate the chances of knee damage to which conventional pedaling exposes the cyclist; and applying a uniform curved shape in the dead point region to avoid stress spikes and the related knee damages inherent to other ovoid designs.

DESCRIPTION OF THE MECHANISM

In this way, with the invented ovoid chainring, a similar power generation could, in principle, be achieved, by imitating the dynamics of the Rotor in the phase of maximum power generation, although it could not be attained to such a degree as with the Rotor crank. This is because it would be necessary to opt for a smaller equivalent elongation in order to prevent abrupt changes of speed in the legs at the dead spot because it is desirable to maintain as uniform a rotational speed as is possible in this region. In order to attain this, a smaller variation in the drive radius would be necessary throughout the cycle: if the instantaneous gear ratio for a 53-tooth chainring with the Rotor means going from a minimum of 47.6 to a maximum of 58.8 (and for off-road and reclining bicycle versions an even greater degree of eccentricity), the new 53-tooth ovoid chainring would apply a proposed variation in the region of 50.9-55.9.

Its principal innovation is determined by the orientation factor: from the imitation of the Rotor we have a reliable initial approximation for the average use, peaking in the region between 100°-120° from TDC (this is dependent on chainring size and its application, in mountainbiking or road riding, for example). Additionally, as already mentioned, the orientation factor of the Rotor is a parameter to be selected by the user, since it is adjustable. This is achieved in the design of this ovoid chainring by incorporating several fastening possibilities within a small angle of rotation around the optimal setting, which enables the chainring to be tailored by positioning it at different settings around the defined preferred or middle position.

To the aforementioned innovations, we also consider the most appropriate elongation and form factors, so that speed in the legs may be as uniform as possible and not prove detrimental when pedaling at a high cadence, in spite of having achieved an almost perfect orientation factor.

For an ovoid chainring the angular speed function represents a periodic function, which, depending on its shape and therefore the form factor, will resemble, to a greater or lesser extent, a sine curve. However, the elongation of the chainring will give rise to the degree of variation between peaks and troughs of this function; and the extent to which it varies from the sine function will stem from the form factor. These variations would then be reflected in accelerations which may or may not be acceptable to the cyclist's legs.

In order to consider one parameter relative to the chainring form factor, we will consider the "relative perimeter", defined by the primitive perimeter of the ovoid divided by the perimeter of the ellipse corresponding to the chainrings major and minor primitive diameters.

In this respect, it is advisable to have an elongation factor of around 1.075 to 1.125, which means the major primitive diameter being 7.5% -12.5% greater than the minor primitive diameter, which permits reasonable variations between the maximum and minimum pedal speeds; and a perimeter relationship in the region of 0.98 to 1—this means that the profile of the ovoid will be inscribed by the ellipse of the same major and minor diameters—which will enable the acceleration transitions to be optimized at biomechanical level, so that, allowing for ankle play, a movement is achieved for the legs that is as uniform as possible to facilitate high cadence pedaling without harming the knees. This will make the curvature radius as small as possible, around the minor diameter, allowing the chainring to imitate a classic round chainring as much as possible in order to attain the intended health benefits.

These chainrings would have an advantage over the Rotor in that, being compatible with the traditional cranks, they do not require users to change cranks or bottom brackets, so they could be sold at an affordable price for any public. In addition, it would mean only a scarce increase in weight in relation to conventional pedaling, and the absence of moving parts will not cause loss of power due to friction and require no additional specific maintenance.

On the other hand, compared with the Rotor, we lose part of the potential biomechanical improvement and, above all, we cannot attain the same comfort and health benefits for the knees, which are two strong points of the Rotor system compared with conventional pedaling, and for this reason, so as not to actually cause harm in this aspect, we have to forgo part of the potential performance benefits, choosing a more moderate elongation.

Thus, what is aimed at may be summarized as: optimizing conventional pedaling without requiring replacement of the traditional bottom bracket and crank mechanism, making use of an ovoid chainring that imitates a Rotor—but of moderated eccentricity—during the main power phase, and a smaller circular chainring around the dead centers.

DETAILED DESCRIPTION OF EMBODIMENTS OF THE INVENTION

Figure 1:
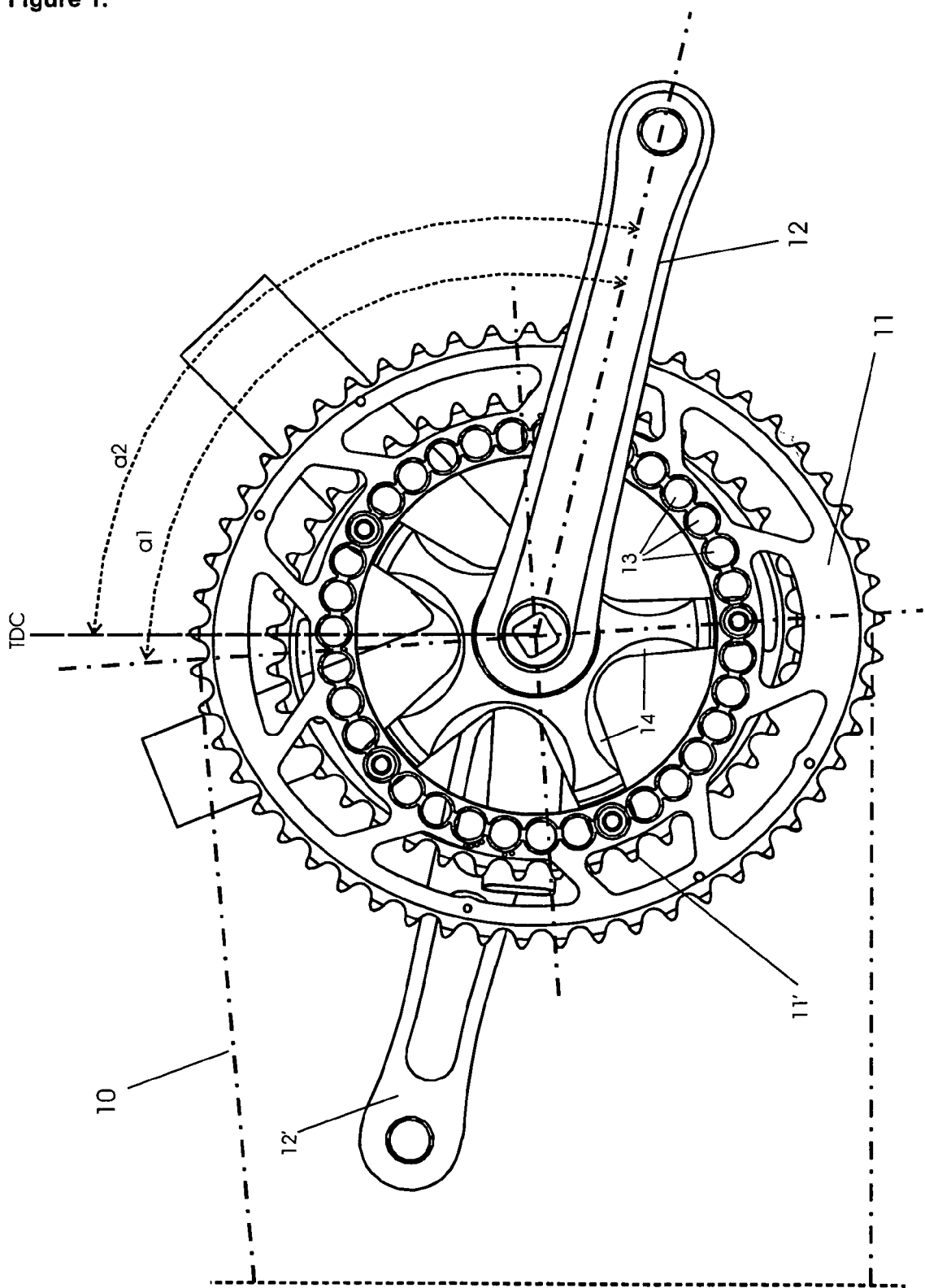
FIG. 1 is a front elevational view of a traditional crankset fitted with a set of two ovoid chainrings which correspond to the present invention.

FIG. 1 shows a pair of cranks (12, 12') assembling two ovoid chainrings 11 and 11', and with a chain (not shown), which is represented by a dotted line 10, at the moment that it engages the ovoid chainring 11 at the time of maximum gear ratio. Angle a1 is the angle obtained when the orientation of the ovoid chainring 11 is in the initial adjustment, and it is a design parameter. Angle a2 is the angle of the orientation with reference to TDC, and will vary slightly depending on where the chain 10 comes from, i.e. from the sprocket of the cassette (not shown) being used at any given time, and on the geometry of the bicycle (not shown), specifically on the length and angle of the stays that link the bottom bracket with the rear wheel.

Figure 2:
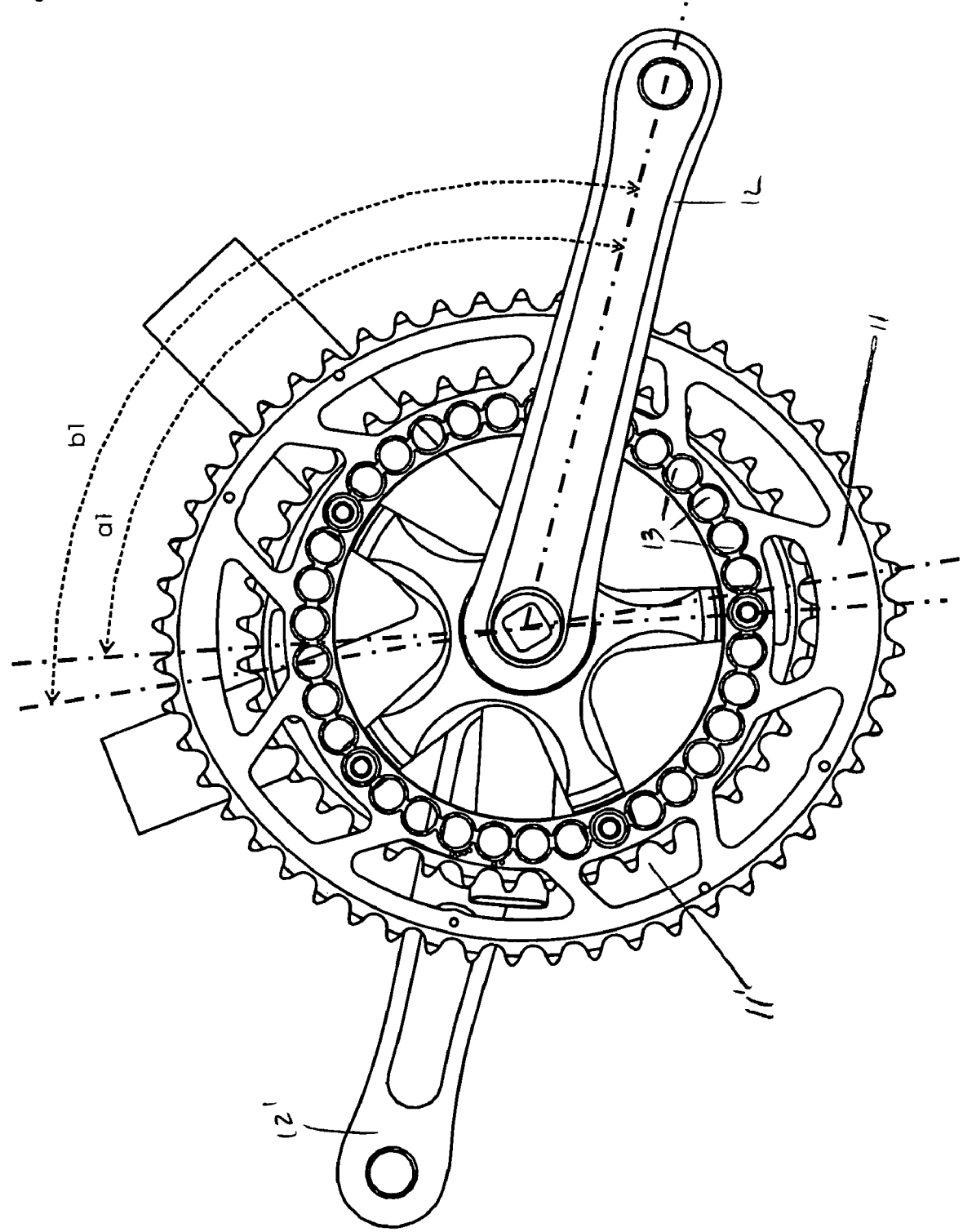
FIG. 2 is a front elevational view of the chainset of FIG. 1 with an indication of the variance in the orientation between the major axes of the separate chainrings.

FIG. 2 shows the same crankset (12, 12', 11, 11') and indicates the variance in the orientation, viz., compare a1 and b1, between the major axes of the separate chainrings of the invention.

FIG. 1 shows the reference orientation for this ovoid chainring 11 (which is a 53-tooth chainring) located at 108 degrees is (i.e., a1) from the crank arm 12. Additionally, this design specifically provides for the possibility of adjustment of the orientation factor, since it has a plurality of holes 13 for connecting to the spider arms 14 of conventional cranks. To be specific, it has 35 holes 13 spaced equally at ~10.286° (=35/360°0) apart, which means that for chainring 11 the orientation factor may be adjusted every ~5.1430. This is so that, if chainring 11 is turned 17 holes, i.e. ~174.857°, it proves to be the same as setting it with a skew of ~5.143°.

An ovoid chainring could be more finely adjusted by bringing the holes even closer together than for chainring 11, to the point that they overlap one another. This is the case for chainring 11''' showed in FIG. 9.

Figure 3:
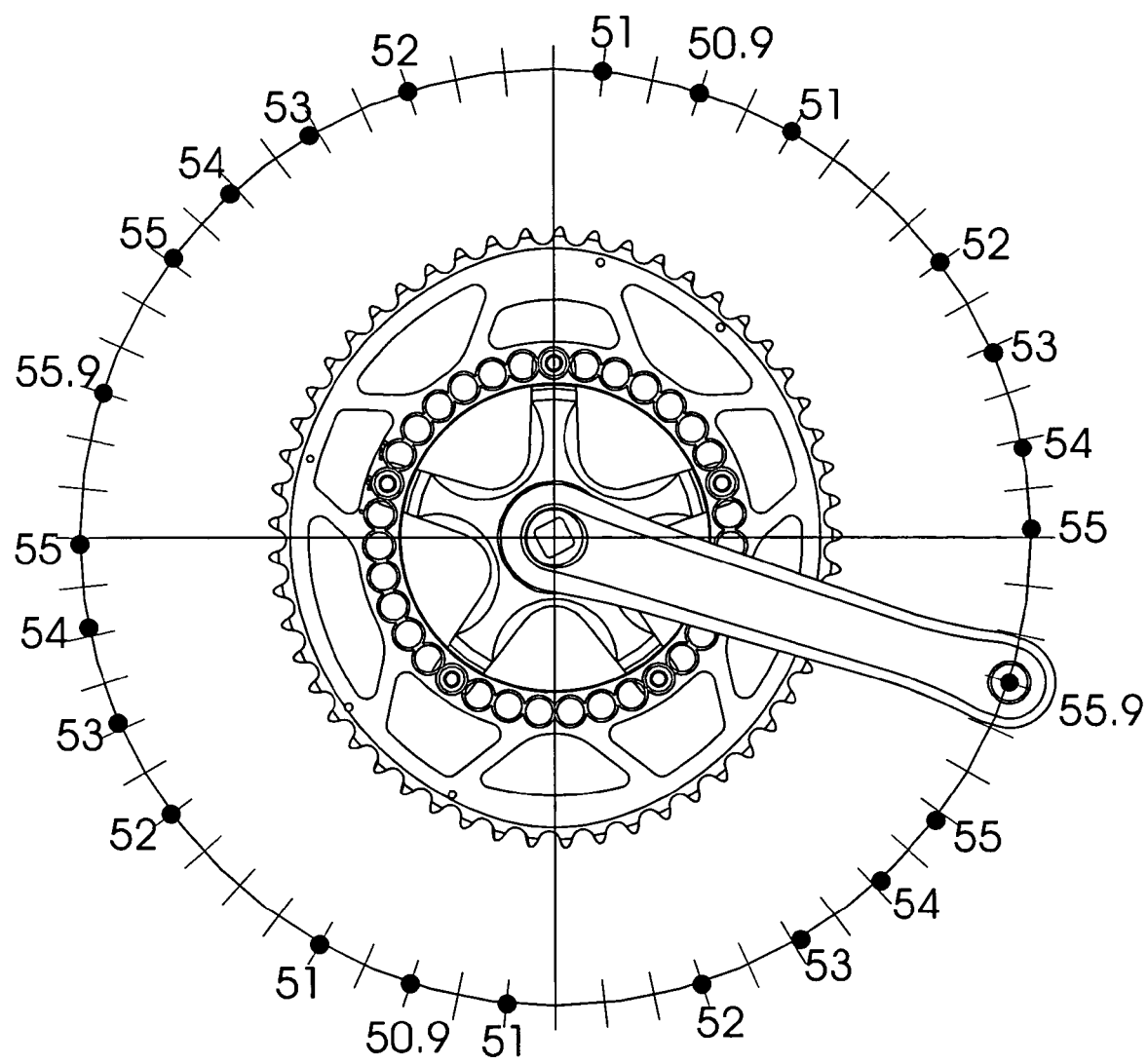
FIG. 3 is a representation of the gear ratio for a 53-tooth ovoid chainring imposed upon a front elevational view of the crankset of the present invention.
Figure 4:
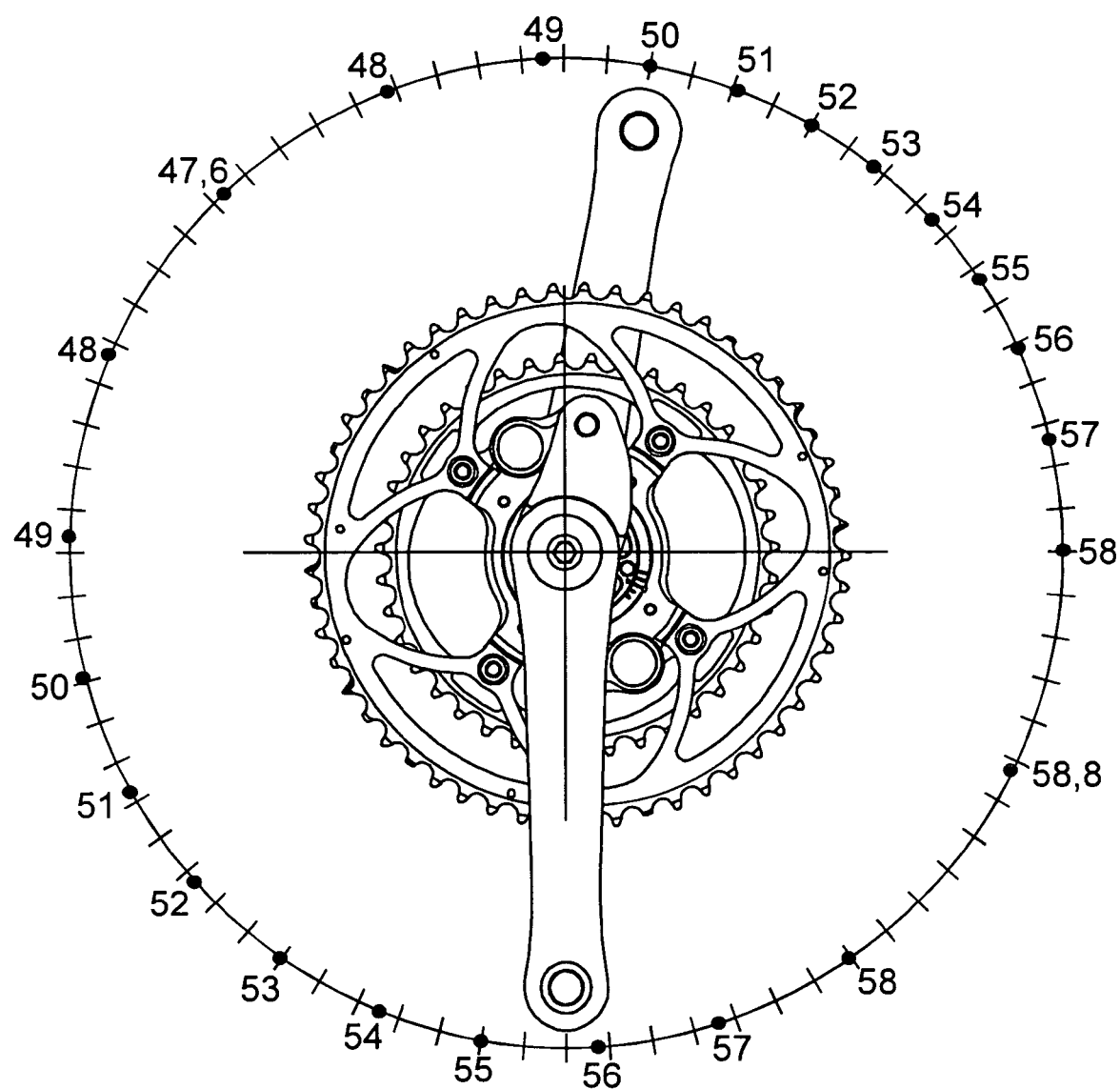
FIG. 4 is a representation of the gear ratio for a 53-tooth "Rotor RS4" chainring imposed on a front elevational view of a "Rotor RS4" crankset.

Relative to chainring 11 which is a 53-tooth chainring, in FIG. 3, the number written next to each point is the equivalent tooth count, effective at the point in time that the pedal hole of the crank is at the position of the mark. As the orientation factor is at the user's discretion, and depending on whether this is changed up or down, the diagram represented would turn clockwise or counterclockwise in relation to the position of the crank arm. The varying entry vector of the chain in relation to the chainrings, between the largest and the smallest sprocket of the rear cassette, will also have a slight effect on the orientation of the equivalent tooth count diagram. FIG. 4 shows the instantaneous equivalent chainring size for a prior art "Rotor RS4" crankset with a 53-tooth chainring.

Figure 5:
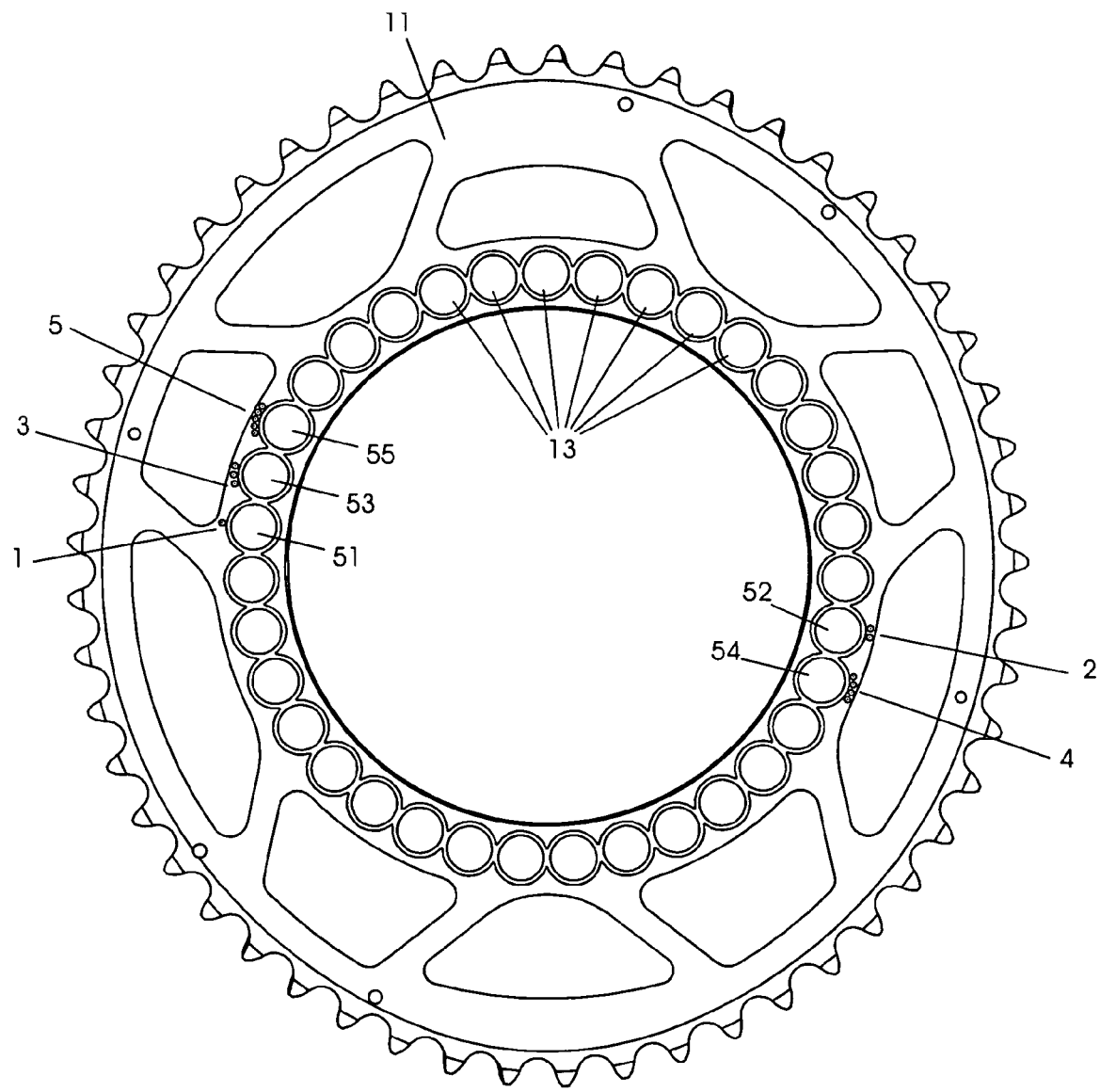
FIG. 5 is a front elevational view of a chainring of the present invention.

To facilitate regulation, the chainring 11, as shown in FIG. 5, has five holes (51, 52, 53, 54, 55) marked with reference numbers (1 to 5) in order to indicate the inventor subjected most effective/comfortable fastening possibilities. These references numbers are represented by dimples. The middle one, number 3, referred to hole 53, represents the anchorage for the cited reference orientation. The other reference numbers, referred to holes 51, 52, 54, 55, are a guideline by which the consumer can regulate the orientation effectively.

As the standard adjustment for this large road chainring 11, it is suggested that the hole 53 for anchorage to the crank 12 that defines the direction of the latter should be positioned such that when the pulled chain 10 is perpendicular to the major primitive diameter of the chainring 11, the crank 12 is approximately 105° from top dead center (a2 in FIG. 1). For this 53T chainring 11, this coincides with an orientation angle of 108° (a1 in FIG. 1). The real angle between TDC and the center line of the crank 12 for the reference adjustment is defined by the entry vector range of the chain 10 onto the chainring 11.

In general, the standard adjustment will be at orientation values of 100° to 120°. Large road chainrings will tend to be over 100°, with inner chainrings having a greater angle of around 110°. Mountainbike versions will tend to be 120°. This is due to the entry vector of the chain as it engages the chainring, as well as the kinematics of common use of the chainring in question. For other biking disciplines, like recumbent, where the bike geometries are quite different to regular upright or diamond frame bikes, the position of the crank in respect to the major diameter can be so far apart from 100-120°, but the optimum max gear will also occur 100-120° after their particular TDC (opposed to that pedal position where the distance to the hip is maximum).

The elongation factor for this 53T chainring 11 has a value of 1.10, which permits reasonable variations between the maximum and minimum pedal speeds. For a use different from road bicycles (racing bikes), such as for instance off-road or recumbent bicycles, this value may be somewhat larger due to the greater negative influence that the dead center has on this type of pedaling. In order to prevent drivetrain or derailleur compatibility problems, this elongation factor can also be reduced. The common range of variance is expected to be from 1.075 to 1.125.

Figure 6:
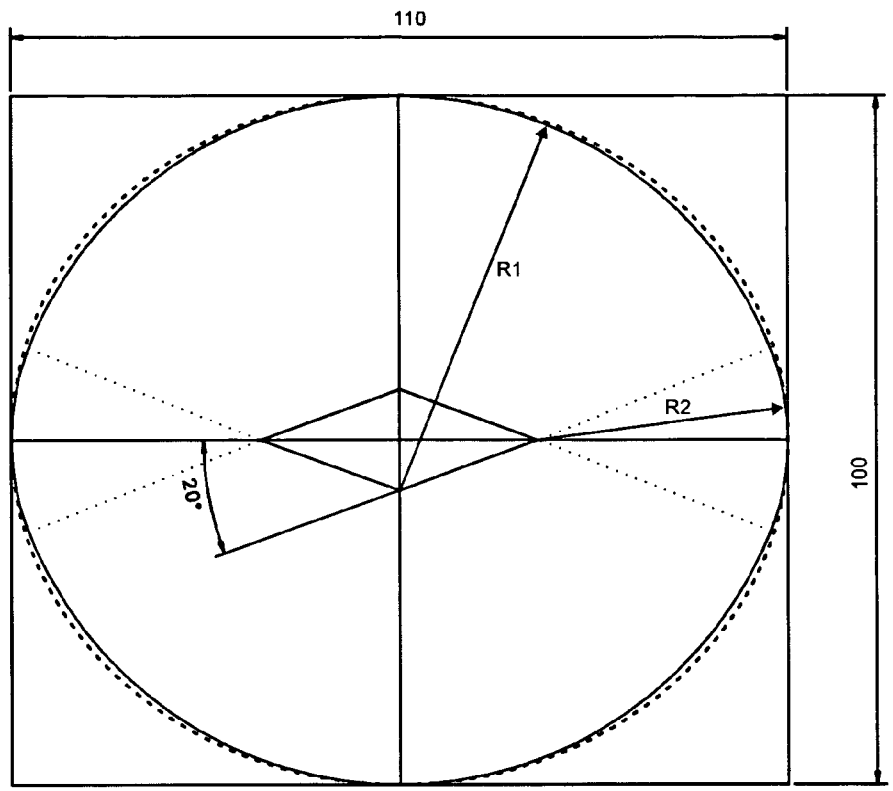
FIG. 6 is a superimposition of an oval conforming to a chainring of the present invention on an ellipse with same elongation factor.

FIG. 6 shows an ellipse with an elongation factor of 1.10, represented with a dotted line. The form of the chainring 11 is an oval corresponding to the solid line of FIG. 6, such that the rhombus described by the four centre points of the perimeter arcs, has acute angles of 40° (see FIG. 6). For this oval the perimeter relation regarding the corresponding ellipse is 0.993.

Figure 7:
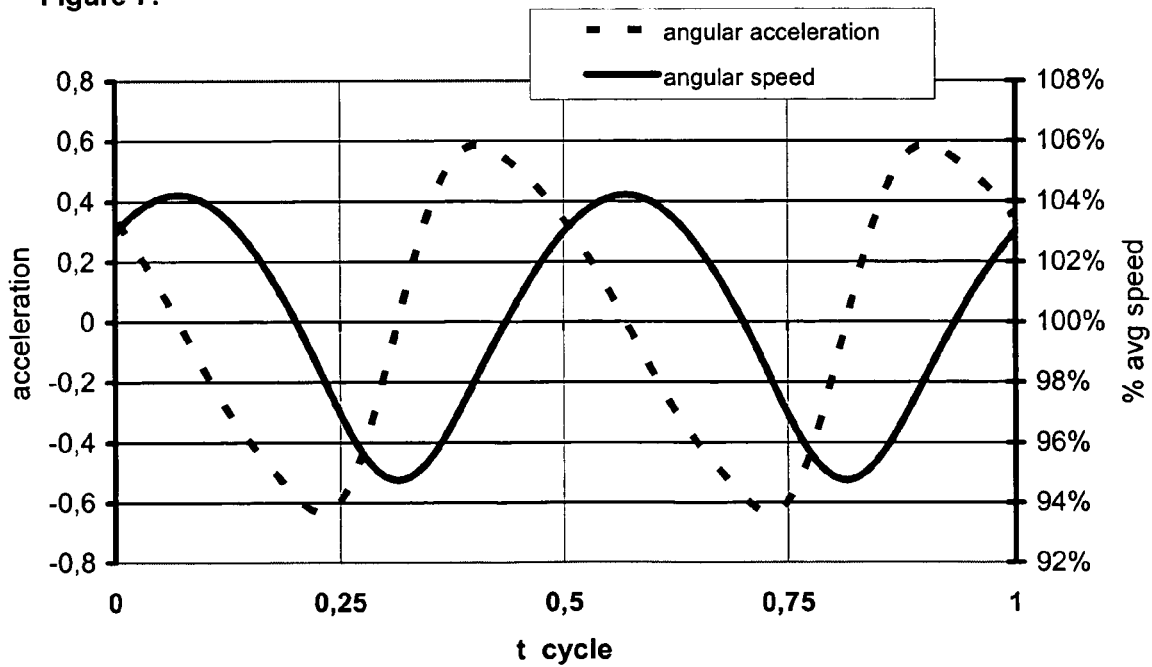
FIG. 7 is a graphical representation of the speed and acceleration as functions of time for a pedaling cycle of an ovoid chainring of the present invention.

The kinematics for this chainring design is as represented in FIG. 7, where the broken line represents the angular acceleration and the solid line represents angular speed. FIG. 7 shows how the time in which the speed is greater than the mean is more than 50% of the cycle. In this way, the variations in speed at the dead centers are minimized for the sake of maximum comfort for the knees. Therefore, the time in which the speed is lower than the mean is less than 50% of the cycle, but combined with the angular play at the ankle during the pedaling cycle, this means that uniform pedaling is achieved for the legs, which is of the weakest points in the use of ovoid chainrings.

Figure 8:
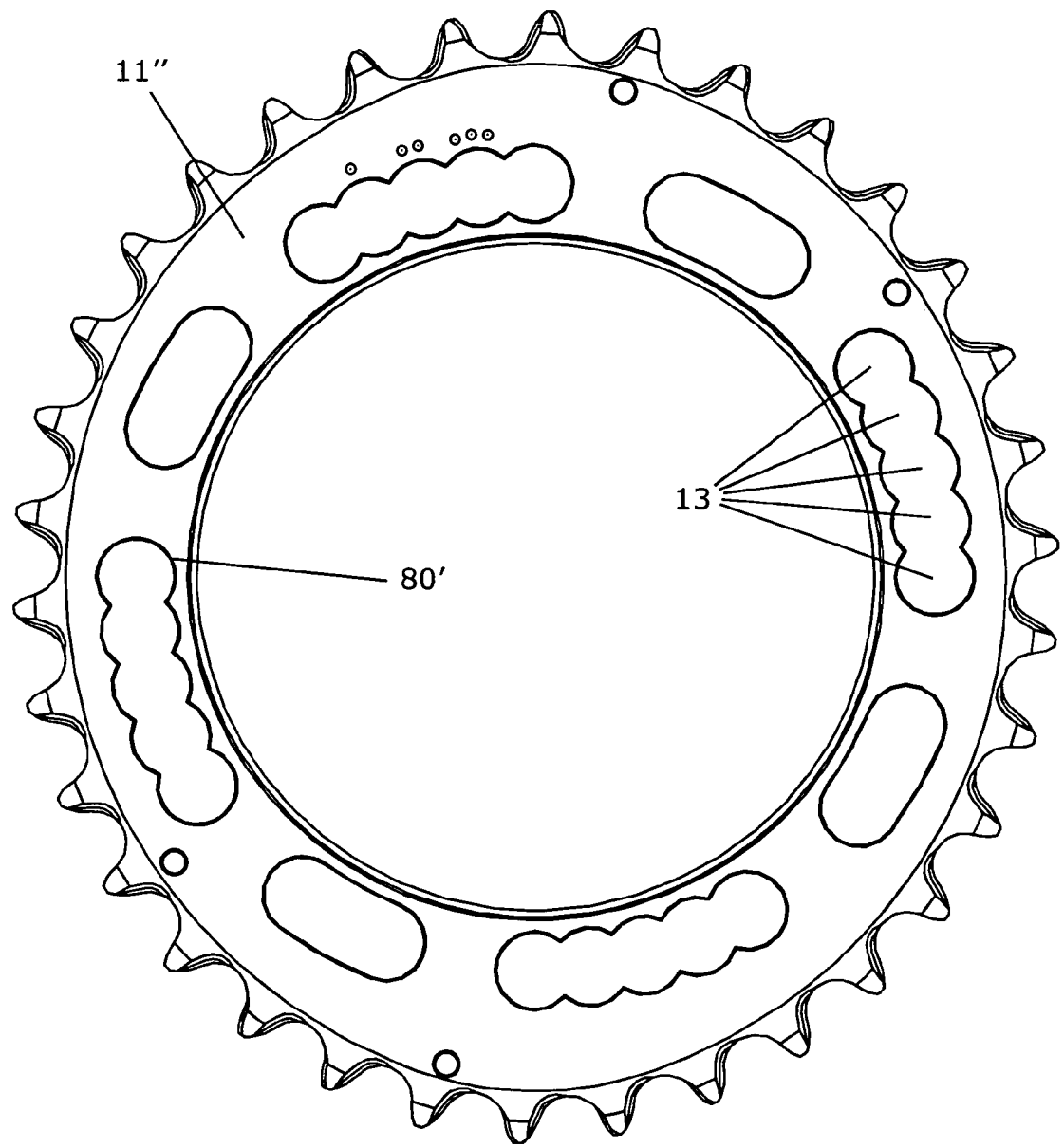
FIG. 8 is a front elevational view of an alternate embodiment of the chainring of the present invention.

The embodiment shown in FIG. 8 is intended for cranks with four arm spiders. Visible on this chainring 11" are the elongated compound holes 80' that result from setting holes 13 in such proximity that they intersect one another.

Figure 9:
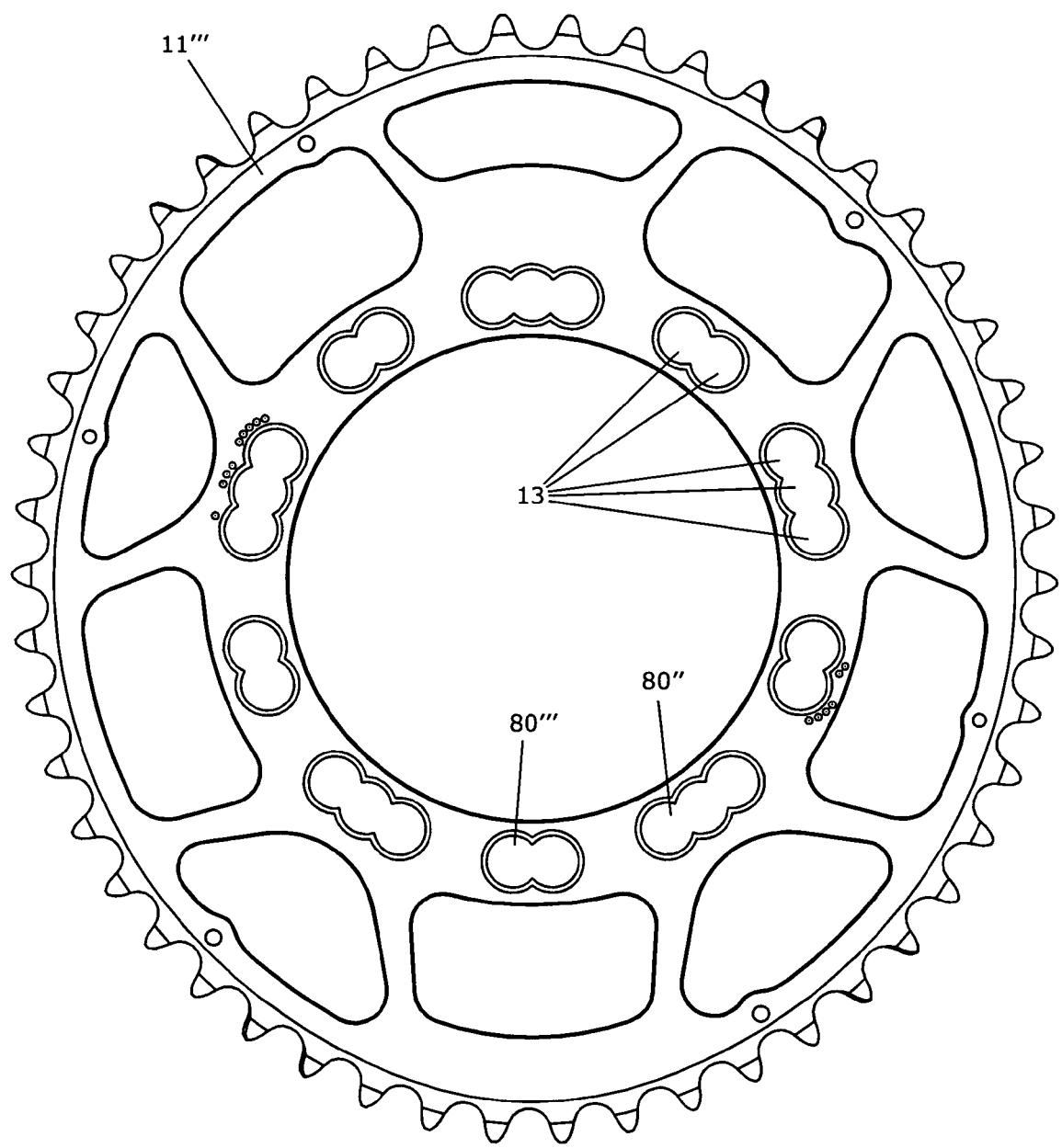
FIG. 9 is a front elevational view of an alternate embodiment of the chainring of the present invention.

FIG. 9 shows a further embodiment of a chainring 11'" intended for cranks with five arm "compact" spiders. The triple compound holes 80" constitute settings 1, 3, and 5 of chainring 11'", and are separated by 8 degrees of rotation. The dual compound holes 80'" constitute settings 2 and 4. Settings 2 and 4 offer half an effective degree of variation change between settings 1 and 3 or 3 and 5.

Figure 10:
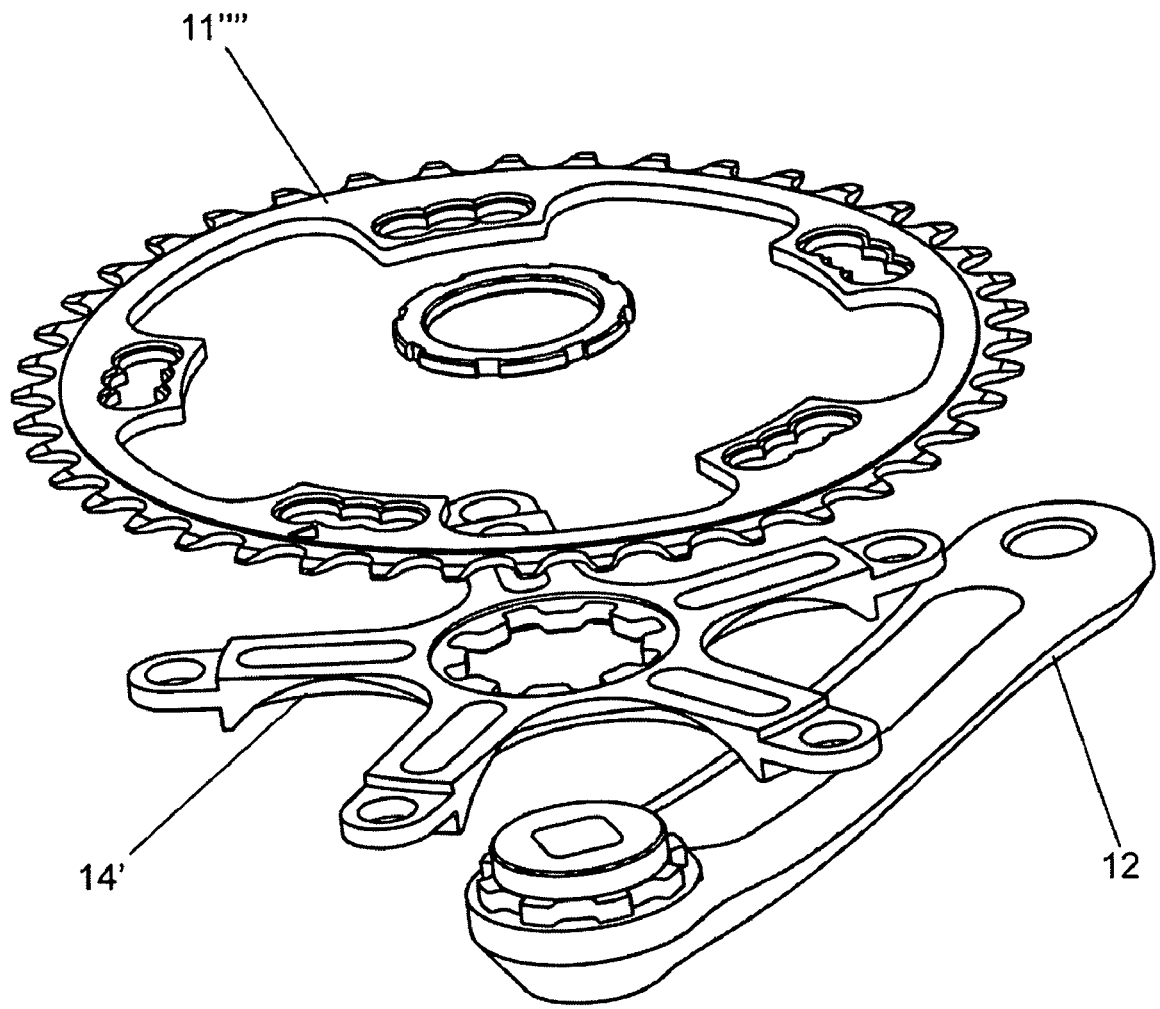
FIG. 10 is a front side perspective view of a disassembled crankset employing an alternate embodiment of the chainring of the present invention for use with a removable, adjustable crank spider.

FIG. 10 shows an alternate ovoid chainring 11"" of the present invention, which chainring is engagable to a removable, adjustable crank spider 14'. This embodiment permits a wider range of orientation adjustments. Changing both the chainring and spider settings allows for smaller angular variations to be made.

OTHER POSSIBILITIES

The form factor proposed allows for slight variations in the original perimeter, although ideally there should be no straight sections or others with a large radius of curvature, as these produce acceleration peaks. The most recommendable are oval perimeters like the one proposed, or mixed perimeters which correspond to a given oval in the first and third quadrants and to another different oval or even an ellipse in the second and fourth quadrants, and in this way the deceleration of the leg under load may vary noticeably in relation to the acceleration of the leg under no load.

These ovoid chainrings proposed will be used on conventional cranks, which usually couple various chainrings of different sizes. Every one of them could correspond to the invention proposed and yet have slight variations in their design factors, especially in the orientation factor, as the pedaling conditions may be different when the large chainring is used from when the small one is used. For example, whilst standing the cyclist reaches maximum torque capacity later in the cycle than when sitting on the saddle, and cyclists pedal standing more often in the smaller chainring rather than in the larger chainring.

Regarding the orientation factor, there is a possibility that the adjustment option refers to the design of the anchorage between the spider and the crank, providing that the former is removable, as in that case there does not have to be just one positioning between the crank and the spider (see FIG. 10). In that case the chainring could merely have a traditional anchorage, although the best option would be to be able to combine the multiple anchorage holes of the chainring with those of the spider, whereby an even finer adjustment would be achieved by the wide range of combinations offered. This may prove especially useful when conventional four-arm cranks are used (as in FIG. 8), as with these cranks the adjustment variations offered by the chainring are restricted to the full angular separation between the holes or anchor points.

In any case, the chainring does not need to be provided with anchor points spread over all possible angles, but small variations would also serve the purpose for adjusting orientation, as seen on the chainring of FIGS. 8, 9 and 10. In particular, for special applications such as top end competition and/or very high-end products, the chainrings may be built with a single anchorage for cranks (for saving weight by eliminating the material for all the other anchorages), which should coincide with the rider's desired chainring orientation.

Lastly, we should mention that there is a possibility of replacing the chainring, chain and gear assembly with a belt and pulleys. In this case, all the foregoing would continue to be applicable to an ovoid pulley anchored to the cranks.

What is claimed is:

1. A chainring suitable for road bicycles, which can be fastened to generic bicycle drive-side cranks which have a plurality of extensions as the chainrings' anchorage system, comprising:
    an oval form defined by a major and a minor main primitive diameter, having an elongation of 1.10;
    a profile for the oval form inscribed in an ellipse with same major and minor diameters, having a relative perimeter, defined by the primitive perimeter divided by the perimeter of the ellipse of 0.993;
    provided with a plurality of anchorage holes in number which is a multiple of said plurality of extensions; permitting multiple anchorage options to the corresponding drive-side crank;
    having a single anchorage option marked as preferred, by which the chainring is fastened to the corresponding drive-side crank having an orientation, defined by the angle in pedaling direction between the major primitive diameter of the ovoid and the centerline of the fastened crank, of 108°; and
    the other anchorage options having orientations of around 108°, wherein each of the multiple options is specifically marked as having a greater or smaller orientation value, resulting in an indicated setting scale.

2. A chainring according to claim 1, for a generic bicycle drive-side crank having 5 anchorage extensions, further comprising a distribution of 35 equidistant anchorage holes allowing for fine adjustment of the ovoid orientation, from a preferred anchorage corresponding to 108°, by using one of two anchorage possibilities that can be found in the distribution of the 35 holes, directly opposite and equidistant 17 holes in either direction, from the preferred anchorage, which are indicated on the setting scale.

3. A chainring according to claim 1, for a generic bicycle drive-side crank having 5 anchorage extensions, further comprising a distribution of 25 anchorage holes allowing for fine adjustment of the ovoid orientation, from a preferred anchorage corresponding to 108°, by using one of two anchorage possibilities that can be found in the distribution of the 25 holes, directly opposite and equidistant 12 holes in either direction, from the preferred anchorage, which are indicated on the setting scale.

4. A chainring suitable for mountainbikes, which can be fastened to generic bicycle drive-side cranks which have a plurality of extensions as the chainrings' anchorage system; comprising:
    an oval form defined by a major and a minor main primitive diameter, having an elongation of 1.10;

a profile for the oval form inscribed in an ellipse with same major and minor diameters, having a relative perimeter, defined by the primitive perimeter divided by the perimeter of the ellipse of 0.993;

provided with a plurality of anchorage holes in number which is a multiple of said plurality of extensions; permitting multiple anchorage options to the corresponding drive-side having a single anchorage option marked as preferred, by which the chain ring is fastened to the corresponding drive-side crank having an orientation, defined by the angle in pedaling direction between the major primitive diameter of the ovoid and the centerline of the fastened crank, of 119°; and the other anchorage options having orientations of around 119°, wherein each of the multiple options is specifically marked as having a greater or smaller orientation value, resulting in an indicated setting scale.

* * * * *